United States Patent [19]

Sugiura

[11] Patent Number: 4,581,929

[45] Date of Patent: Apr. 15, 1986

[54] AIR FLOW METER CIRCUIT WITH TEMPERATURE COMPENSATION CIRCUIT

[75] Inventor: Noboru Sugiura, Mito, Japan

[73] Assignee: Hitachi, Ltd., Tokyo, Japan

[21] Appl. No.: 667,134

[22] Filed: Nov. 1, 1984

[30] Foreign Application Priority Data

Nov. 4, 1983 [JP] Japan ................................ 58-205795

[51] Int. Cl.$^4$ .............................................. G01F 1/68
[52] U.S. Cl. .................................................... 73/204
[58] Field of Search ............................. 73/861.02, 204

[56] References Cited

U.S. PATENT DOCUMENTS 3,085,431 4/1963 Yerman et al. ...................... 73/204
4,413,514 11/1983 Bowman .............................. 73/204

FOREIGN PATENT DOCUMENTS 0006416 1/1983 Japan .................................... 73/204
0045568 3/1983 Japan .................................... 73/204

Primary Examiner—Herbert Goldstein
Attorney, Agent, or Firm—Antonelli, Terry & Wands

[57] ABSTRACT

An air flow meter circuit with a temperature compensation circuit comprises an air flow rate detection circuit for generating an output signal in accordance with an air flow rate, an output circuit for amplifying the output signal of the air flow rate detection circuit to produce an output signal whose value is so adjusted as to be related to the value of the input signal in a predetermined relationship, and a constant voltage circuit for supplying a predetermined reference voltage to the air flow rate detection and output circuits. In order to compensate the output of the air flow meter circuit for its changes due to the influence of temperature coefficients of component parts of both the air flow rate detection and output circuits, the temperature coefficient of the output of the constant voltage circuit is so adjusted as to cancel out the temperature coefficients of the parts constituting the air flow meter circuit.

12 Claims, 4 Drawing Figures

AIR FLOW METER CIRCUIT WITH TEMPERATURE COMPENSATION CIRCUIT

The present invention generally relates to an air flow meter circuit with a temperature compensation circuit and more particularly to a temperature compensation circuit for compensating changes in output due to changes in temperature of the entirety of the air flow meter circuit.

In an internal combustion engine, for example, the intake air flow rate of the internal combustion engine is detected and used as a parameter for controlling the operation of the internal combustion engine. For detection of the intake air flow rate, a hot wire air flow meter, for example, is available wherein a hot wire heated to a predetermined temperature is placed in an intake air path, and a current flowing through the heated hot wire is measured to detect an air flow rate. This type of air flow meter is disclosed in, for example, U.S. Pat. No. 4,297,881 to Sasayama et al issued on Nov. 3, 1981. Since, in an air flow meter, the value of air flow rate to be detected changes with the temperature of intake air, it has hitherto been practice to compensate the detected output for intake air temperature. Generally, in a hot wire air flow meter, for example, a cold wire is provided in addition to the hot wire, which cold wire is placed in the same intake air path to effect the detection of the air temperature simultaneous with the compensation therefor. Generally, this type of temperature compensation is also employed in a variety of intake air flow meters of the other types.

Even with the compensation for the intake air temperature, there still remains, in practice, a problem that parts constituting the air flow meter circuit, for example, resistors change in their resistance values as the ambient temperature changes. Thus, because of a temperature characteristic of each of the component parts, the relation between air flow rate and output value also has, in practice, a temperature characteristic, i.e., temperature dependence. Especially, in the case of the air flow meter for use in internal combustion engines, a flow meter module is placed in an engine room and hence exposed to large changes in temperature. Therefore, the problem of the temperature dependence is serious.

The inventors have found that such temperature dependence has a great effect on accuracies of the air flow meter and recognized the necessity of compensation for the temperature characteristic.

In addition, higher accuracy is required for a temperature compensation circuit of that air flow meter than for general temperature compensation circuits, because the air flow rate is related to the output value of the air flow detection circuit by a fourth-power exponential function as will be described later with reference to a formula and therefore, in order to measure a flow rate with 4% accuracy, for example, the accuracy of the detection must be held to be 1%. Furthermore, since the temperature coefficient of one air flow meter usually differs from that of another, desirability is such that desired adjustment of the temperature coefficient can be done with ease and the temperature compensation never disturbs the predetermined relation between air flow rate and output value. However, a highly accurate temperature compensation circuit has not been materialized heretofore which can meet the above particular conditions imposed on the temperature compensation circuit of the air flow meter.

The present invention has been achieved with a view of solving the novel subject matter found by the inventors and of meeting the necessity of temperature compensation for the entirety of the air flow meter circuit as well as the necessity of provision of a highly accurate temperature compensation circuit.

Accordingly, an object of this invention is to provide an air flow meter circuit subject to the temperature compensation which meets the aforementioned subject matter.

Another object of this invention is to provide a highly accurate temperature compensation circuit which is simplified in construction and easy to adjust.

To accomplish the above objects, according to the present invention, an air flow meter circuit incorporates a temperature compensation circuit which is simplified in construction and adjustable in order for its temperature coefficient to be a desired value, whereby the temperature coefficients of other circuits than the temperature compensation circuit are compensated so as to zero the temperature coefficient of the entirety of the air flow meter circuit. To obtain the temperature compensation circuit of simplified construction according to the invention, the inventors take advantage of such a characteristic of a Zener diode that the temperature coefficient of the Zener voltage (Zener voltage change/temperature change) varies with Zener current value, to realize a circuit whose temperature coefficient can be set desirably by adjusting the Zener current.

The present invention will be apparent from the following detailed description taken in conjunction with the accompanying drawings, in which.

Figure 1:
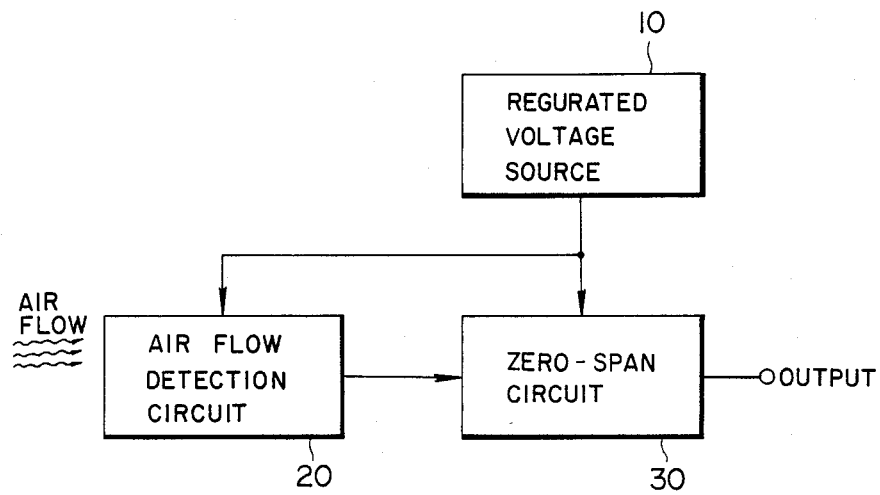
FIG. 1 is a block diagram showing the construction of an air flow meter circuit.

Referring to FIG. 1, an air flow detection circuit 20 has its output connected to the input of a zero-span circuit 30. The detection circuit 20 and zero-span circuit 30 are supplied with a predetermined reference voltage from a regulated voltage source 10.

An air flow to be measured, shown at wavy arrows in FIG. 1, impinges upon an air flow rate detection device, not shown, of the detection circuit 20, and a flow rate is detected as an electrical signal. The detected signal is inputted to the zero-span circuit 30 where the input value versus the output value is so adjusted as to be in a predetermined relationship. Specifically, zero point and inclination of a characteristic curve representative of the input value versus the output value are determined. Such predetermined relationship of the zero-span circuit 30 is determined by a request from a separate control circuit, not shown, connected to the output of the zero-span circuit 30.

Figure 2:
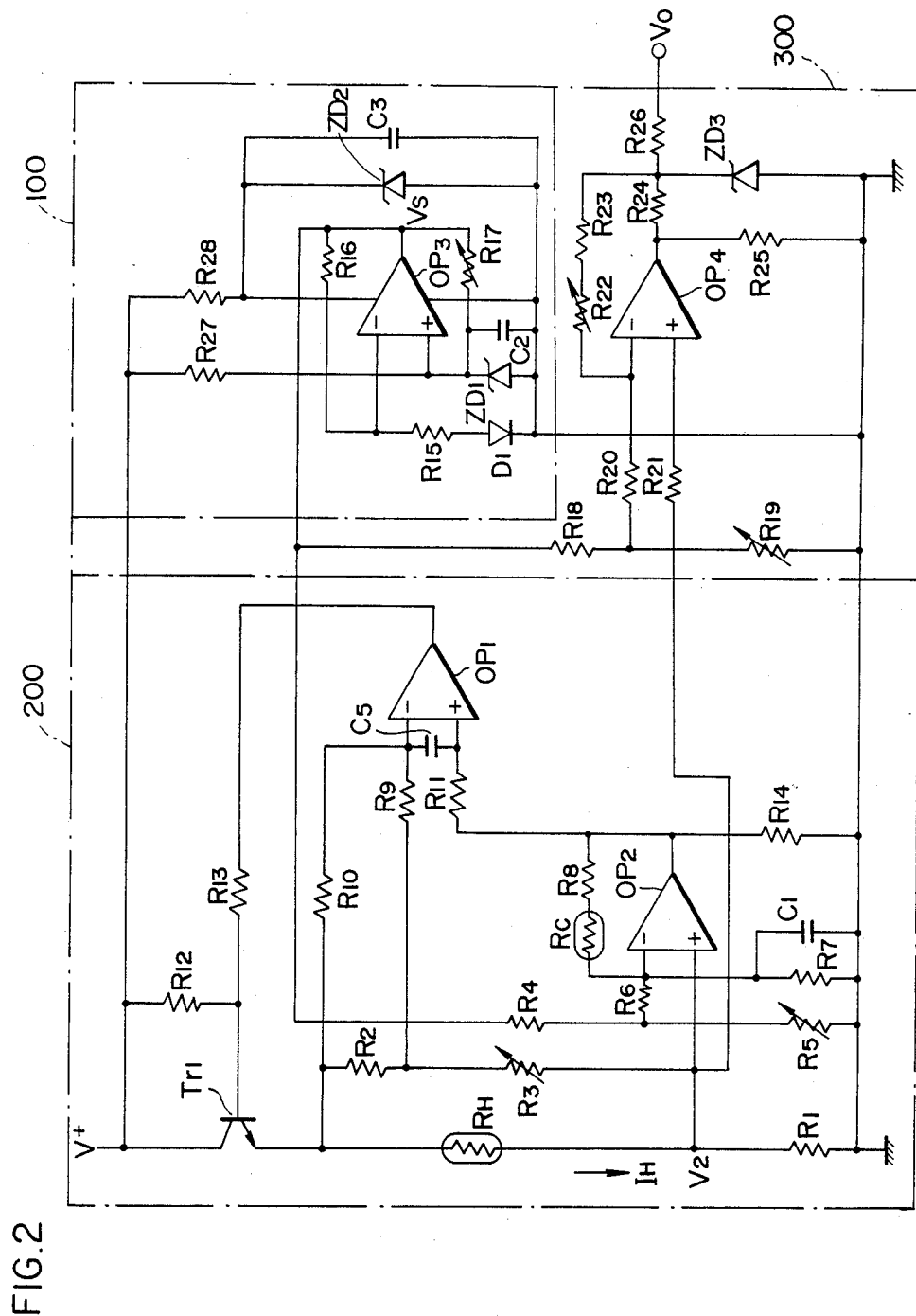
FIG. 2 is a circuit diagram showing an air flow meter circuit with a temperature compensation circuit according to an embodiment of the invention.

FIG. 2 shows a preferred embodiment of an air flow meter with a temperature compensation circuit according to the invention. The hot wire air flow meter described previously is used as an air flow meter in this embodiment. Referring to FIG. 2, power supply voltage $V_+$ is supplied to the collector of a transistor Tr 1 having its emitter connected to a hot wire RH placed in an air flow path (not shown). The other end of this hot wire RH is grounded via a resistor R1. Connected across the collector and base of the transistor Tr 1 is a resistor R12. Resistors R2 and R10 are connected, at one end, in common to the emitter of the transistor Tr 1. The other end of the resistor R2 is connected to the inverting input terminal of an operational amplifier OP1 via a resistor R9. The other end of the resistor 2 is also connected to one end of a variable resistor R3, the other end of which is connected to the non-inverting input terminal of an operational amplifier OP4 via a resistor R21. The junction between the variable resistor R3 and resistor R21 is connected with the junction between the hot wire RH and resistor R1. A voltage drop $V_2$ due to a current flowing through the hot wire RH and resistor R1 is applied to the non-inverting input terminal of the operational amplifier OP4 via the resistor R21. The other end of the resistor R10 is connected to the inverting input terminal of the operational amplifier OP1. Both the input terminals of this operational amplifier OP1 are bridged via a capacitor C5.

The non-inverting input terminal of the operational amplifier OP1 is connected to a resistor R11 having the other end connected to a resistor R14. A resistor R4 has one end connected to the output of a constant voltage circuit 100 blocked by chained line and the other end connected to a resistor R6 and a variable resistor R5. The other end of the resistor R6 is connected with the inverting input terminal of an operational amplifier OP2. The non-inverting input terminal of this operational amplifier OP2 is connected to the junction between the hot wire RH and resistor R1. Connected across the output terminal and inverting terminal of the operational amplifier OP2 is a series connection of a cold wire RC and a resistor R8. The cold wire RC is placed at a position where the temperature of air flow to be measured can be detected. The output terminal of the operational amplifier OP2 is also connected to the non-inverting input terminal of the operational amplifier OP1 via the resistor R11 and grounded via the resistor R14. A resistor R7 and a capacitor C1 are connected, at one end, in common to the inverting input terminal of the operational amplifier, with the other end of each of the resistor R7 and capacitor C1 grounded.

The transistor Tr1, hot wire RH, cold wire RC, resistors R1 to R14, capacitors SC1 and C5, and operational amplifiers OP1 and OP2 constitute a feedback circuit 200 which controls the current $I_H$ such that the temperature of the hot wire RH is kept constant. Thus, the voltage drop $V_2$ due to the current flowing through the resistor R1 stands for the flow rate detection signal. To be specific, when the air flow impinges on the hot wire, this hot wire is deprived of heat by aerial molecules and decreased in temperature. An amount of current of the hot wire to compensate for a decreased temperature thereof corresponds to an air flow rate. This feedback circuit 200 corresponds to the air flow detection circuit 20 shown in FIG. 1.

Connected to the resistor R4 of this feedback circuit 200 are one end of a resistor R18 and the output terminal of an operational amplifier OP3, i.e., the output of the constant voltage circuit 100. A variable resistor R19 and a resistor R20 are connected, at one end, to the other end of the resistor R18. The variable resistor R19 has the other end grounded and the resistor R20 has the other end connected with the inverting input terminal of the operational amplifier OP4.

The output terminal and the inverting input terminal of the operational amplifier OP3 are connected together via a resistor R16, with that inverting input terminal grounded via a series connection of a resistor R15 and a diode D1. The non-inverting input terminal of the operational amplifier OP3 is supplied with the power supply voltage $V_+$ via a resistor R27 and grounded via a Zener diode ZD1 in backward connection. A variable resistor R17 is connected between the output terminal of the operational amplifier OP3 and the cathode of the Zener diode ZD1, and the junction between the variable resistor R17 and the cathode of the Zener diode ZD1 is connected with one end of a capacitor C2, the other end of which is grounded. The operational amplifier OP3 is also fed with the power supply voltage $V_+$ via a resistor R28. The resistor R28 is connected with one end of a capacitor C3 and the cathode of a Zener diode ZD2. The other end of the capacitor C3 and the anode of the Zener diode ZD2 are grounded. The capacitor C3 and Zener diode ZD2 are adapted to protect the operational amplifier OP3 from surge voltage from the power supply. In this manner, the constant voltage circuit 100 is constituted.

Meanwhile, the inverting input terminal of the operational amplifier OP4 is also connected with a series connection of a variable resistor R22 and a resistor R23. The resistor R23 is grounded via a Zener diode ZD3 in backward connection. The cathode of the Zener diode ZD3 is connected via a resistor R24 to the output terminal of operational amplifier OP4 which is grounded via a resistor R25. The resistor R24 is connected with one end of a resistor R26 having the other end connected to an output terminal $V_0$. The resistors R18 to R26, Zener diode ZD3 and operational amplifier OP4 constitute a zero-span circuit 300. Like the operational amplifier OP3, each of the operational amplifier OP1, OP2 and OP4 is also fed by the power supply voltage $V_+$ but for clarity of illustration, the feed line is not depicted.

The operation of the FIG. 2 circuit will be described briefly.

To describe the operation of the feedback circuit 200 in the first place, it should be understood that each of the hot wire RH and cold wire RC has a platinum wire wound on an aluminum bobbin and is placed in the intake air flow path so as to be sufficiently exposed to the flowing air. Both the hot and cold wires have their own resistances exhibiting a positive characteristic with respect to temperatures. In other words, their resistances increase as the temperature rises.

A predetermined amount of current $I_H$ is fed from the transistor Tr1 into the hot wire RH which in turn is heated to a temperature which is higher than the temperature of the flowing air by a predetermined temperature $\Delta T_H$. Since the cold wire RC is on the other hand connected to act as a feedback resistor for the operational amplifier OP2 and only an extremely small amount of current is passed through the cold wire RC, the temperature of the cold wire is hardly affected by the current and maintained at the same value as that of a temperature of the flowing air.

The voltage $V_2$ caused across the resistor R1 by the current flowing from the hot wire RH into the resistor R1 is amplified by the operational amplifier OP2 and fed to the non-inverting input terminal of the operational amplifier OP1. Since the sum of resistances of the resistors R2 and R3 is set to be sufficiently greater than a resistance of the hot wire RH, the current flowing in the resistor R1 has substantially the same value as that of the current $I_H$ flowing in the hot wire RH.

The operational amplifier OP2 effects a feedback by an amount which is determined by the resistance of the cold wire RC, thereby compensating the intake air for its temperature.

The operational amplifier OP1 compares a voltage divided a voltage drop across the hot wire RH by the resistors R2 and R3 with the output voltage of the operational amplifier OP2 to produce a output voltage commensurate to the difference which in turn is fedback to the hot wire RH via the transistor Tr1, so that the current $I_H$ flowing in the hot wire RH is so controlled as to constantly keep the temperature of the hot wire RH higher than the temperature of the intake air by $\Delta T_H$.

Consequently, as the intake air flow rate changes, the quantity of heat deprived from the hot wire RH by the intake air changes and then the current $I_H$ changes in a sense for cancelling a temperature change of the hot wire RH being deprived of heat. Eventually, the current $I_H$ changes as a function of the intake air flow rate. Due to the fact that the current flowing in the resistor R1 substantially equals $I_H$, the voltage drop $V_2$ across the resistor R1 represents the intake air flow rate. Specifically, the amount of intake air flow Q is related to the voltage $V_2$ by $V_2 \alpha Q^{\frac{1}{2}}$.

Thus, the voltage $V_2$ fed to the operational amplifier OP4 is amplified thereby to produce a flow rate signal $V_0$ at the output terminal. This signal $V_0$ may be inputted to a microcomputer for engine control, for example, and used for air/fuel ratio control.

Next, the operation of the zero-span circuit 300 will be described. This circuit is a non-inverting amplifier using an operational amplifier. By adjusting the variable resistor R19 connected to the inverting input terminal, the bias voltage of the operational amplifier OP4 can be varied to adjust the output signal $V_0$ to a desired level. Further, by adjusting the variable resistor R22 inserted in the feedback loop of the operational amplifier OP4, the gain of the non-inverting amplifier can be varied to desirably set the rate of change of the output signal $V_0$ relative to the input signal $V_2$, i.e., the input/output characteristic. Thank to the function of adjustments, the output characteristic of the air flow meter can be matched with the specification of a control circuit, not shown, fed with the output signal $V_0$. The Zener diode ZD3 provided for the output of the operational amplifier OP4 is adapted to absorb external high voltage noises which intrude into the zero-span circuit 300.

The operation of the constant voltage circuit 100 will now be described. This circuit is adapted not only to supply the reference voltage to the operational amplifiers included in the feedback circuit 200 and zero-span circuit 300 but also to achieve the temperature compensation for the entirety of the air flow meter circuit which is the subject matter of the present invention. In essentiality, the temperature coefficient of that reference voltage is adjusted to compensate the entirety of the air flow meter circuit for temperature. For details, reference should be made to FIGS. 3 and 4.

Figure 3:
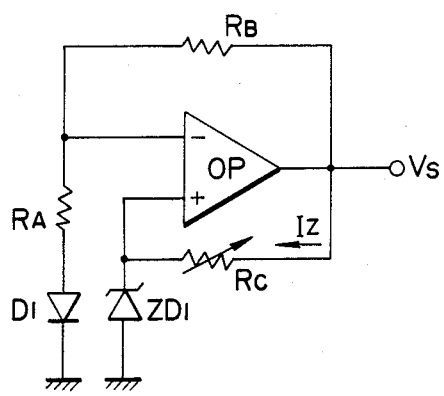
FIG. 3 is a circuit diagram useful in explaining the temperature compensation circuit of the invention.

In FIG. 3, the power supply voltage feed line inclusive of the resistor R28 is not illustrated for simplicity. Further, there is no illustration, in FIG. 3, of the parallel connection of the Zener diode ZD2 and capacitor C3 for protecting the operational amplifier OP3 from surge voltage, the capacitor C2 for noise protection and the resistor R27 for passage of starting current of the constant voltage circuit upon turn-on of the power supply source, all of which are unessential to the present invention.

Figure 4:
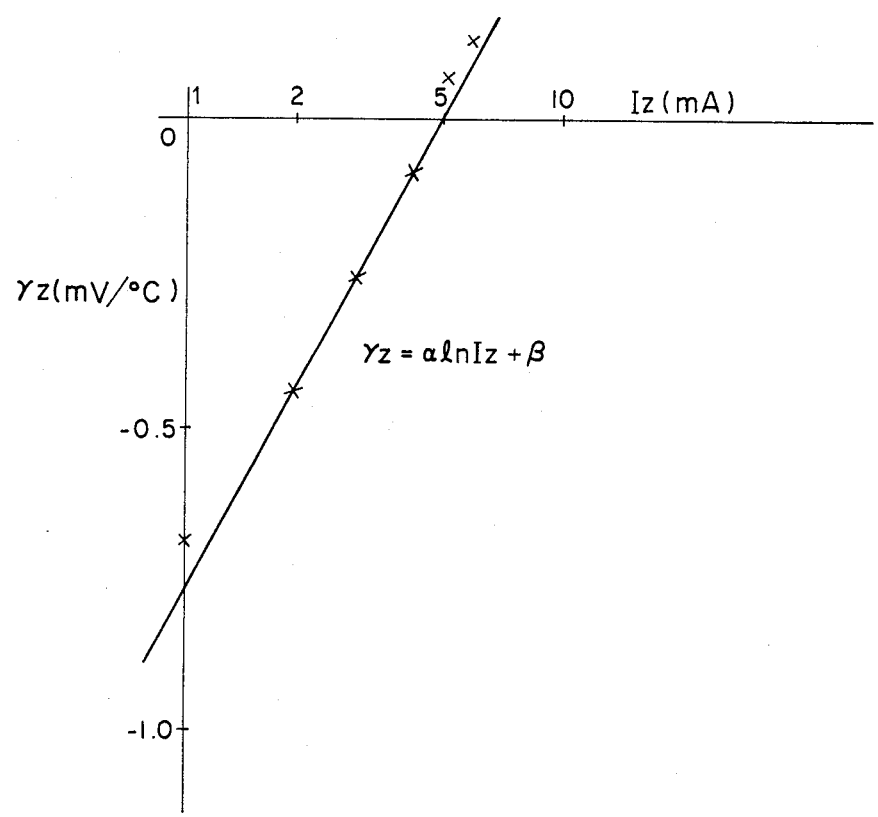
FIG. 4 is a graph showing an actual example of temperature coefficient characteristic of a Zener diode.

Taking a Zener diode of HZ 2B-LL type manufactured by Hitachi Ltd., for instance, a characteristic of temperature coefficient $\gamma_Z$ (mV/°C.) relative to Zener current $I_Z$ (mA) of the Zener diode playing the part of basis in the principle of the present invention is plotted in FIG. 4, where abscissa represents Zener current in logarithmic scale and ordinate temperature coefficient. As will be seen from FIG. 4, the temperature coefficient of Zener voltage changes with the Zener current.

From the characteristic curve, the temperature coefficient $\gamma_Z$ of the Zener diode can be indicated by equation (1):

$$\gamma_Z = \alpha \ln I_z + \beta \quad (1)$$

where $\alpha = 4.78 \times 10^{-4}$ and $\beta = 2.54 \times 10^{-4}$.

The embodiment of FIG. 3 comprises an operational amplifier OP, resistors $R_A$, $R_B$ and $R_C$, a diode D1, and a Zener diode ZD1. Then, denoting a forward voltage of the diode D1 by $V_F$, a Zener voltage of the Zener diode ZD1 by $V_Z$, and a set output voltage by $V_S$, there results $$V_S = -\frac{R_B}{R_A} V_F + \left(1 + \frac{R_B}{R_A}\right) V_Z. \quad (2)$$

By neglecting temperature coefficients of the resistors $R_A$ and $R_B$, the temperature coefficient, $\gamma_S$, of the output voltage of the constant voltage circuit is given by $$\gamma_S = \frac{dV_S}{dT} \quad (3)$$

$$= \frac{R_B}{R_A} \left(\frac{\partial V_Z}{\partial T} - \frac{\partial V_F}{\partial T}\right)$$

$$= \frac{R_B}{R_A} (\gamma_Z - \gamma_F)$$

where $\gamma_F$ represents a temperature coefficient of the diode D1.

It will be seen from equation (3) that the temperature coefficient $\gamma_S$ of the constant voltage circuit can be adjusted desirably by varying the temperature coefficient $\gamma_Z$ of the Zener diode ZD1. Considering that the temperature coefficient $\gamma_F$ of the diode is generally of the order of $-2$ mV/°C., $\gamma_Z = -2$ mV/°C. may be set by adjusting the Zener current $I_Z$ when the temperature coefficient $\gamma_S$ of the output voltage $V_S$ is desired to be about 0 mV/°C., for example. The value of $\gamma_Z = -2$ mV/°C. is, however, outside of the controlling range as will be noted from FIG. 4. Then, in order to obtain the value of $\gamma_S$ of about 0 mV/°C., the diode D1 may be short-circuited (placed out of use) to zero the term of $\gamma_F$ in equation (3) and the variable resistor RC may be adjusted so as to set the Zener current $I_Z$ to about 5 mA which makes the $\gamma_Z$ substantially zero. The circuit of FIGS. 3 or 2 employs the diode D1 because without the diode D1, it is necessary to make the Zener current larger than 5 mA, followed by an increase in power consumption in the power supply circuit, in order to provide the constant voltage circuit with the positive temperature coefficient. By the use of the diode D1 as in FIG. 2, the adjustment for the positive temperature coefficient can be done with ease for a Zener current $I_Z$ which is less than 5 mA. For example, to obtain the positive temperature coefficient $\gamma_S$ under the condition that $R_B/R_A = 1.0$, $V_F = 0.7$ V and $V_Z = 2$ V, there stands $$\gamma_S = 1 \times (\gamma_Z + 2) \text{ (mV/°C.)} \tag{4}$$

From the characteristic curve of FIG. 4, $\gamma_Z$ is 0.77 mV/°C. for $I_Z = 1$ mA and hence $$\gamma_S = 1.23 \text{ mV/°C.} \tag{5}$$

is obtained which is positive.

Accordingly, the temperature coefficient $\gamma_S$ of the constant voltage circuit can be desirably set to be positive, zero or negative by varying the value of the Zener current $I_Z$ through the adjustment of the variable resistor $R_c$.

Since the adjustment of the variable resistor $R_c$ has no appreciable effect on the absolute value of the set voltage $V_S$ (actually, the internal resistance and Zener voltage of the Zener diode are negligibly slightly increased), the temperature compensation circuit of FIG. 3 can be incorporated into a circuit requiring a suppressed temperature dependence characteristic, whereby the variable resistor $R_c$ is adjusted for temperature compensation to suppress the temperature dependence. The FIG. 2 air flow meter circuit of the present invention implements the basic principle of the temperature compensation described thus far.

In the circuit of FIG. 2, the output signal $V_0$ of the zero-span circuit 300 is, $$V_0 = 1 + \frac{R22}{R20 + (R18//R19)} \cdot R1 \cdot I_H - \tag{6}$$

$$\frac{R22}{R20 + (R18//R19)} \cdot \frac{R19}{R18 + R19} \cdot V_Z$$

where $I_H$ is current flowing in the hot wire RH and $V_Z$ is a Zener voltage of the Zener diode ZD1, as described previously, and symbol "$||$" denotes a parallel resultant resistance of the resistors R18 and R19 to mean that $R18 || R19 = R18 \cdot R19/R18 + R19$.

Assuming that, $$1 + \frac{R22}{R20 + (R18//R19)} = C \text{ and}$$

$$\frac{R22}{R20 + (R18//R19)} \cdot \frac{R19}{R18 + R19} = D,$$

the equation (6) is reduced to $$V_0 = C \cdot V_2 - D \cdot V_Z \tag{7}$$

where $V_2$ is a voltage drop across the resistor R1 as described previously.

Pursuant to the King's formula, the relation between the flow rate detection output $V_2$ and the air flow rate Q is expressed by $$V_2^2 = A + B\sqrt{Q}$$

where Q is in terms of Kg/h, A and B are coefficients, and $V_2$ is given by $$V_2 = I_H \times R1 \tag{9}$$

Consequently, the current $I_H$ in the hot wire RH is related to the air flow rate Q by a fourth-power root function, and the coefficients A, B, C and D are determined by the resistors constituting the air flow meter circuit.

When the temperature of the air flow meter module changes, the parameters, especially, C, D, $I_H$ and R1 change under the influence of the temperature coefficients of the component elements constituting the circuit and as a result, the output signal $V_0$ of the air flow meter circuit changes. The change in the output signal $V_0$ can be cancelled by adjusting the temperature coefficient $\gamma_S$ of the output voltage $V_S$ of the constant voltage circuit 100 described with reference to the equations (2) and (3).

Denoting a change in the output signal $V_0$ due to a change in temperature by $\Delta V_0$, from the equations (7) and (9), there is obtained $$\Delta V_0 = C R_1 \Delta I_H + I_H \\ (C \Delta R_1 + R_1 \Delta A) - \Delta D \cdot V_S - D \cdot \Delta V_S \tag{10}$$

The output change $\Delta V_0$ of the air flow meter circuit given in equation (10) can be zeroed by adjusting the temperature dependent change $\Delta V_S$ of the output voltage $V_S$ of the constant voltage circuit 100 through the adjustment of the temperature coefficient $\gamma_s$.

Practically, the output voltage of the air flow meter circuit placed in a predetermined ambient temperature is first confirmed and thereafter, the air flow meter circuit is placed in a different ambient temperature and the variable resistor $R_c$ is adjusted so that the value of the output voltage at condition of the latter ambient temperature equals the output voltage at condition of the former ambient temperature.

As has been described, according to the present invention, the air flow meter free from temperature dependence which is compensated such that its output signal remains unchanged with variations in the ambient temperature can be provided, and the highly accurate temperature compensation circuit can also be provided. The application of the temperature compensation circuit is not limited to the air flow meter but may be extended to various control circuits which similarly disagree with changes in the output signals due to temperature changes. In addition, the temperature coefficient of the temperature compensation circuit can be desirably set and this characteristic may be applied to a circuit which is required to have a specified temperature coefficient.

Further, the present invention is in no way limited to the embodiments described thus for but may include many modifications without departing from the sprit thereof and scope of claims. For example, the invention may be applied to other types of air flow meter than the hot wire air flow meter as exemplified in the foregoing embodiments. Furthermore, the Zener current is adjusted by means of the variable resistor connecting the output of the operational amplifier and the Zener diode in the foregoing embodiments but for adjustment of the Zener current, the variable resistor may be replaced with a fixed resistor and the fixed resistor may be trimmed. Alternatively, the Zener current may be adjusted by using a separate combination of constant voltage source and current control device.

I claim:

1. An air flow meter circuit comprising:

an air flow rate detection circuit for generating an output signal in accordance with an air flow rate;

an output circuit for receiving the output signal of said air flow rate detection circuit as an input signal and amplifying the input signal to produce an output signal whose value is so adjusted as to be related to the value of the input signal in a predetermined relationship;

a constant voltage circuit for supplying a predetermined constant voltage to said detection and output circuits; and temperature compensation means for adjusting the temperature coefficient of the output signal of said constant voltage circuit such that temperature coefficients of said detection and output circuits are cancelled out to substantially zero a change in the output signal due to a change in the temperature of the entirety of said air flow meter circuit.

2. An air flow meter circuit according to claim 1 wherein said constant voltage circuit includes a Zener diode whose Zener voltage is used as a reference voltage, and said temperature compensation means includes a series connection of a constant voltage source and current control means, said series connection being connected to said Zener diode, said current control means being so adjusted as to vary a Zener current to thereby set the temperature coefficient of the output signal of said constant voltage circuit to a predetermined value.

3. An air flow meter circuit according to claim 2, wherein said constant voltage source is provided by the output voltage of said constant voltage circuit, and said current control means comprises a variable resistor.

4. An air flow meter circuit according to claim 3 wherein said air flow rate detection circuit comprises a hot wire air flow rate detection circuit including a hot wire heated to a predetermined temperature and undergoing impingement of an air flow to change current flowing in said hot wire, said current change being detected for measurement of an air flow rate.

5. An air flow meter circuit according to claim 1 wherein said output circuit comprises a non-inverting amplifier circuit having an operational amplifier, and means for varying feedback rate and input reference voltage of said non-inverting amplifier circuit such that the input value versus the output value is so adjusted as to be in the predetermined relationship.

6. An air flow meter circuit according to claim 2 wherein said output circuit comprises a non inverting amplifier circuit having an operational amplifier, and means for varying feedback rate and input reference voltage of said non-inverting amplifier circuit such that the input value versus the output value is so adjusted as to be in the predetermined relationship.

7. An air flow meter circuit according to claim 3 wherein said output circuit comprises a non-inverting amplifier circuit having an operational amplifier, and means for varying feedback rate and input reference voltage of said non-inverting amplifier circuit such that the input value versus the output value is so adjusted as to be in the predetermined relationship.

8. An air flow meter circuit according to claim 4 wherein said output circuit comprises a non-inverting amplifier circuit having an operational amplifier, and means for varying feedback rate and input reference voltage of said non-inverting amplifier circuit such that the input value versus the output value is so adjusted as to be in the predetermined relationship.

9. An air flow meter circuit according to claim 5 wherein the output voltage of said constant voltage circuit is used as the reference voltage of said operational amplifier.

10. An air flow meter circuit according to claim 6 wherein the output voltage of said constant voltage circuit is used as the reference voltage of said operational amplifier.

11. An air flow meter circuit according to claim 7 wherein the output voltage of said constant voltage circuit is used as the reference voltage of said operational amplifier.

12. An air flow meter circuit according to claim 8 wherein the output voltage of said constant voltage circuit is used as the reference voltage of said operational amplifier.

* * * * *